United States Patent [19]

Eckel

[11] 4,140,433

[45] Feb. 20, 1979

[54] WIND TURBINE

[76] Inventor: Oliver C. Eckel, 75 Grove St., Wellesley, Mass. 02181

[21] Appl. No.: 798,007

[22] Filed: May 18, 1977

Related U.S. Application Data

[63] Continuation of Ser. No. 594,818, Jul. 10, 1975, abandoned.

[51] Int. Cl.$^2$ ............................................. F03D 7/00
[52] U.S. Cl. ........................................ 415/2; 415/147; 415/60; 415/193; 290/55; 415/210
[58] Field of Search ....................................... 415/2–4, 415/193, 147, 210, 60; 290/43, 44, 54, 55

[56] References Cited

U.S. PATENT DOCUMENTS

| | | | |
|---|---|---|---|
| 1,876,595 | 9/1932 | Beldimano | 415/60 |
| 1,958,145 | 5/1934 | Jones | 415/193 |
| 2,458,419 | 1/1949 | Reinmann | 415/193 |
| 2,653,754 | 9/1953 | McDonald | 415/147 |
| 2,664,961 | 1/1954 | Goede | 415/210 |
| 3,339,078 | 8/1967 | Crompton | 415/2 |
| 3,346,174 | 10/1967 | Lievens et al. | 415/210 |

FOREIGN PATENT DOCUMENTS 1181926  6/1959  France ..................................... 415/68

*Primary Examiner*—C. J. Husar
*Attorney, Agent, or Firm*—Schiller & Pandiscio

[57] ABSTRACT

A power-generating wind-driven turbine is disclosed which offers the advantage that it is compact and lightweight and is capable of producing a substantially greater output than a conventional windmill with a comparable size rotor. The turbine comprises an outer shroud and a nose cone which provide a streamlined wind collecting inlet designed so that the air stream is contracted to increase its velocity through the turbine blades, plus an exit section designed to exhaust the air stream with a minimum of turbulence.

24 Claims, 12 Drawing Figures

WIND TURBINE

This is a continuation of my copending Application Ser. No. 594,818, filed July 10, 1975, for WIND TURBINE and now abandoned.

This invention relates to the harnessing of wind power and more particularly to novel apparatus for converting kinetic wind energy to mechanical or electrical energy.

Windmills have been known and used for centuries as power generators and typically have been used to pump water and to grind grains such as wheat and corn. Because energy from the wind is free and non-polluting, much attention has been given to improving the efficiency and lowering the cost of windmill structures. Some of the more recent efforts in advancing the art of harnessing wind power are described by E.F. Lindsley, "Wind Power" Popular Science Magazine, July 1974, pp. 54–59, Henry Clews, "Electric Power From The Wind", Copyright 1973, 1974, U.S. Pat. Nos. 3339078 and 3822740, and Report NSF/RANN/SE/GI-39457/PR/74/3, Development of an Electrical Generator and Electrolysis Cell for Wind Energy Conversion System (prepared by Oklahoma State University).

However, the amount of power that a conventional or propeller type windmill can generate is directly proportional to the square of the diameter of the circle of rotation of the blade tips and also to the cube of the wind velocity. The relationship may be expressed broadly as $$P = f[D^2 V^3]$$

where P is the power generated, D is the diameter of the circle of rotation of the blade tips, and V is the velocity of the wind passing through the array of blades. It is known also that the further from the axis the wind force can be applied, the greater will be the torque or rotational force that is generated. On the other hand, the larger the diameter, the slower the rotational speed of the windmill. Also the longer the blade, the more difficult and costly it is to make blades that are lightweight, properly shaped, and capable of responding to the prevailing wind without undergoing excessive deflection or distortion.

Accordingly, the primary object of this invention is to provide a novel wind driven power generator that is capable of generating substantially more power than a conventional windmill having the same size circle of rotation for its blade tip.

Another object is to provide a novel wind driven power generator which is compact in size, comprises several discrete subassemblies which can be made with a modular construction, and is adapted to incorporate and drive an electrical power generator and/or means for driving an external electrical power generator or other device.

A more specific object is to provide a novel wind power generator in the form of a relatively low cost turbine which comprises a rotor and means for directing the air flow so as to maximize the rotational force applied to the rotor blades.

Another specific object is to provide a novel wind driven turbine for generating power which is characterized by a modular construction that permits it to be assembled quickly by semiskilled workers without need for costly and sophisticated equipment and provides a high power-to-weight ratio at relatively low cost and without sacrifice of structural integrity.

Still another object is to provide a battery of mutually supporting power generating wind turbines that are disposed in parallel to one another.

The foregoing objects are achieved by providing a wind turbine that essentially comprises multi-vane input and output stators; a multi-vane rotor located between the input and output stators; a multi-element lightweight shroud forming a wide gathering venturi with (1) a mouth located in advance of the input stator, (2) a throat surrounding the outer perimeter of the stators and the rotor, and (3) a wind expanding exit located downstream of the output stator. The output stator forms part of an assembly which includes a power transmission for producing a mechanical power output and optionally an electrical power generator driven by the power transmission.

Other features and many of the attendant advantages of the invention are disclosed in the following detailed description which is to be considered together with the accompany drawings wherein.

Figure 1:
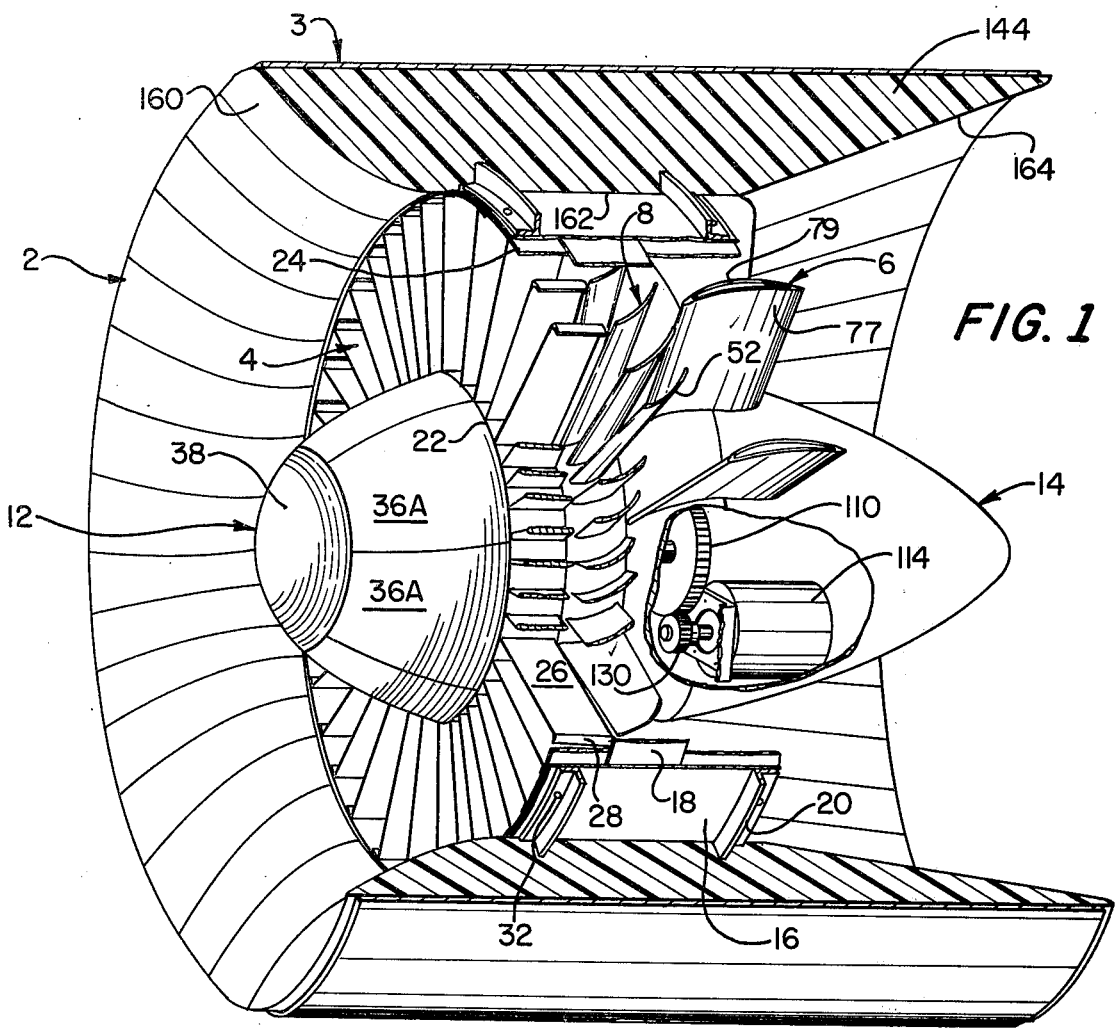
FIG. 1 is a perspective view of a turbine constituting a preferred form of the invention, with certain portions shown in section.
Figure 2:
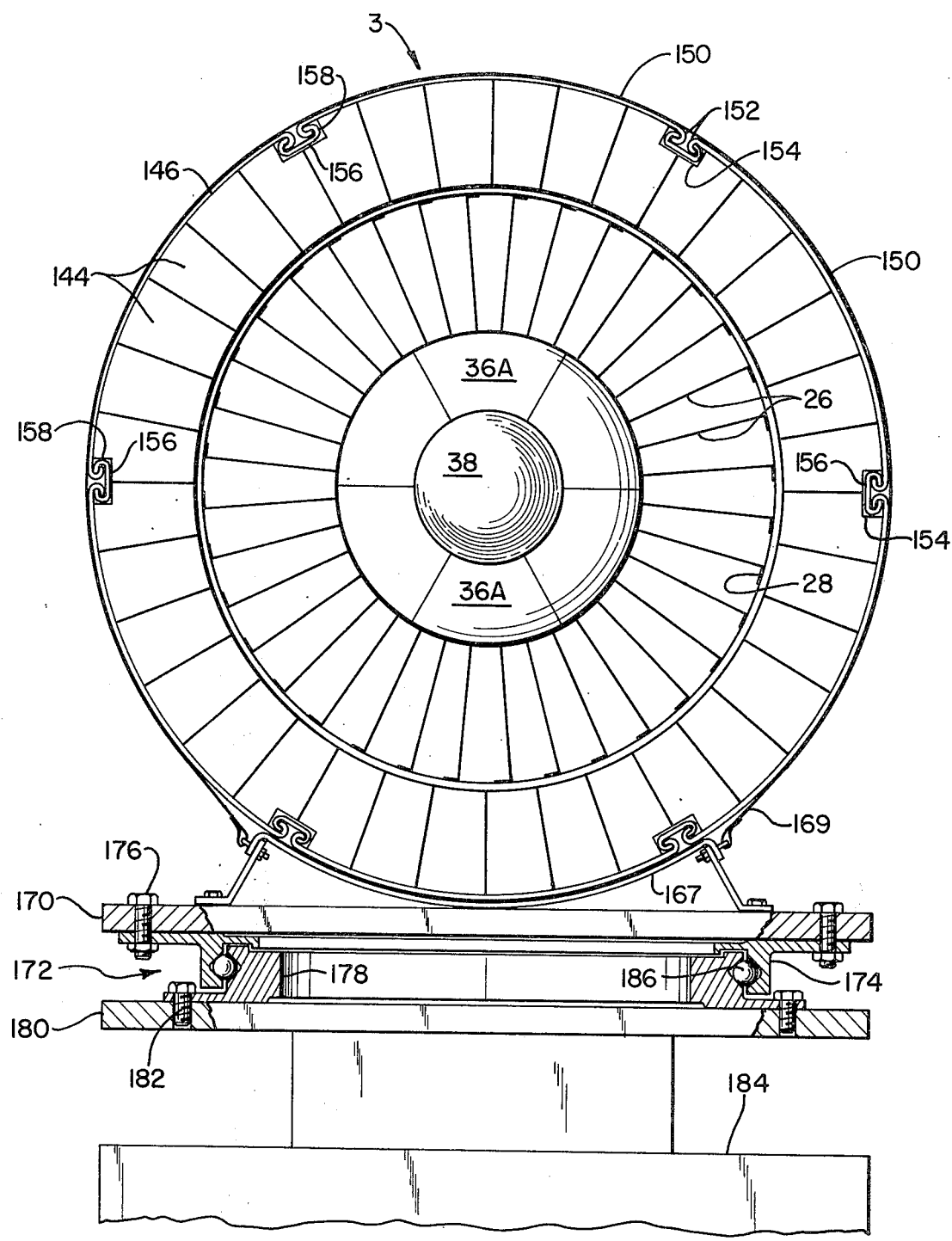
FIG. 2 is a front elevation of the same turbine.
Figure 3:
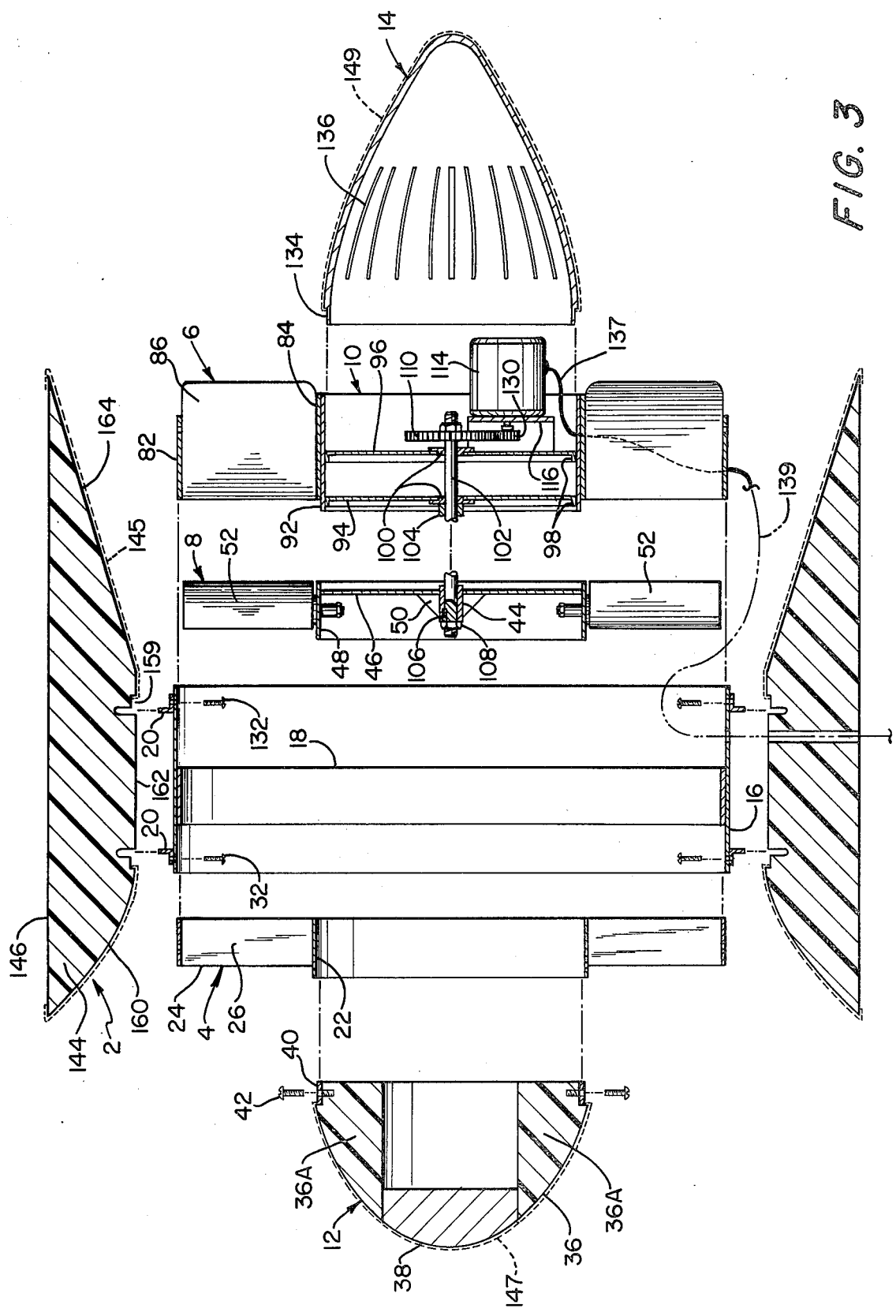
FIG. 3 is an exploded longitudinal sectional view of the same turbine.

Turning now to FIGS. 1–3, the illustrated wind turbine apparatus generally comprises a shroud 2 which forms a wind gathering venturi, a jacket 3 encasing the shroud, an inlet stator assembly 4, an outlet stator assembly 6, a rotor assembly 8 located between the inlet and outlet stator assemblies, a rotor transmission housing 10, a nose cone 12 and a tail cone 14. The shroud surrounds the stator and rotor assemblies.

As shown in FIGS. 1 and 3, the stator and rotor assemblies and the rotor transmission housing are all attached to a main casing ring assembly which consists of a cylindrical main casing ring 16 and a cylindrical stator spacer ring 18 which is attached to the main casing ring and functions as a shroud for the rotor or fan assembly and also as locating stops for the inlet and outlet stator assemblies. The main casing ring has a greater axial length than the stator spacer ring and the latter is located within and secured to the former by welding or by suitable fasteners such as rivets or screws. Additionally a pair of angle iron stiffening rings 20 surround and are secured to the main casing ring adjacent its front and rear edges. These stiffening rings have an L-shaped cross-section and are secured to the main casing ring by welding or by suitable fasteners such as rivets or screws.

Still referring to FIGS. 1-3, the front or inlet stator assembly 4 comprises a pair of cylindrical and concentric inner and outer stator blade support rings 22 and 24 and a plurality of equally spaced stator blades or vanes 26. The stator blades or vanes consist of flat, thin plates which extend radially between the inner and outer support rings and are set so that their straight leading and trailing edges are aligned with the center axis of the support rings. Preferably, as shown in FIGS. 1 and 2, the stator blades are formed with flanges 28 at their outer and inner ends which are employed to secure the blades to the inner and outer support rings. Preferably, but not necessarily, the leading and trailing edges of the inlet stator vanes are tapered to a knife edge. Alternatively, the forward edge of each stator vane may have one shape while the trailing edge may have a different edge, e.g., the forward edge may be rounded or blunt while the trailing edge may be tapered to a sharp knife edge.

The front stator assembly is attached as a unit to main casing ring 16, the outer support ring 24 slipping within the main casing ring and being properly located by virtue of its engagement with the stator spacer ring 18. The front stator assembly is locked to casing ring 16 by screws 32 (FIGS. 1 and 3).

The nose cone 12 is supported by the inlet stator assembly. The nose cone may be formed as a solid member, but preferably it is a hollow unit made up of a plurality of light weight members which fit together to form a nose cone whose outer surface is a surface of revolution. In the preferred embodiment shown in FIGS. 1-3, the nose cone comprises a hollow plastic body 36 which is made of a light weight foam material such as rigid polyurethane foam, a nose plug 38 and a retaining ring 40. The plastic body comprises a plurality of sections 36A (in this case, six) which are disposed in a circular array around the center plug 38. The outer surface of the plug has a uniform curvature shaped to form a continuation of the curvature of the outer surface of the plastic body which is itself a surface of revolution. The plug and the plastic body are secured together by a suitable cement or by other suitable means. The ring 40 is attached to the sections 36 by cementing or by mechanical fastening means or by a friction fit. As shown in FIG. 3, the assembled sections 36 are formed with a peripheral groove to accommodate the retaining ring. The latter is sized so that it can slip within the inner stator vane support ring with the outer surface of the plastic body engaging and forming a smooth transition at the front edge of the inner stator support ring 22 to which it is secured by means of screw fasteners 42 (FIG. 3).

Figure 4:
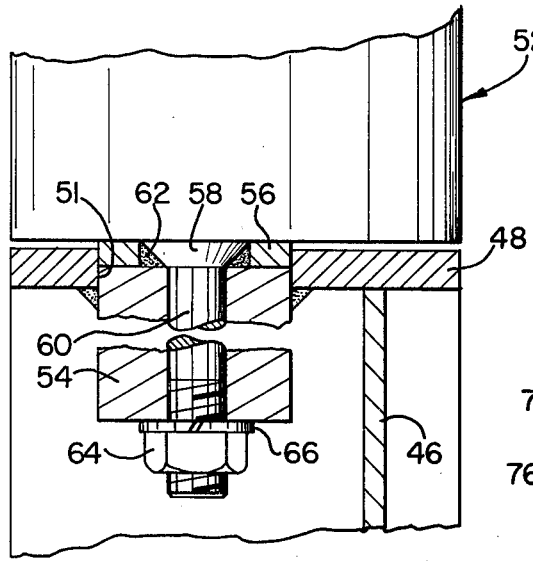
FIG. 4 is a fragmentary longitudinal sectional view on an enlarged scale illustrating how a rotor blade is attached to its hub.
Figure 5:
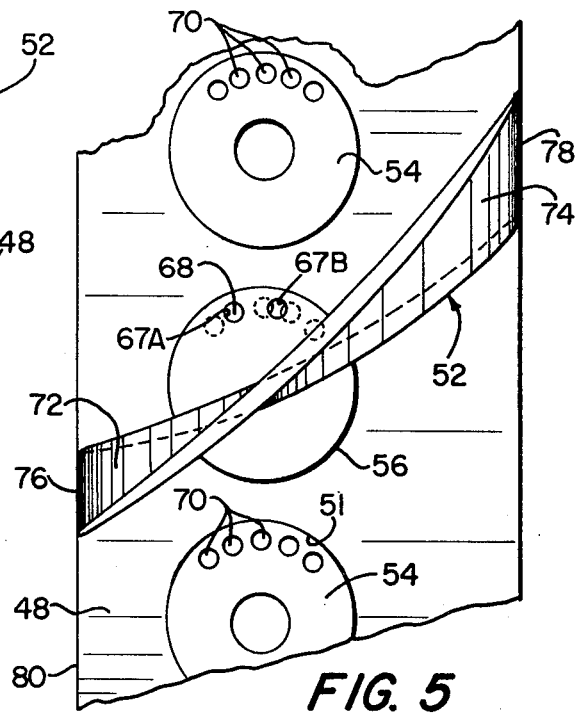
FIG. 5 is a fragmentary plan view illustrating the shape of one of the rotor blades.

Turning now to FIGS. 1, 3, 4 and 5, the rotor assembly comprises a sleeve 44, a circular disk 46 concentric with and affixed to the sleeve, and a cylindrical rim 48 affixed to the periphery of the disk concentric with sleeve 44. Preferably a plurality of reinforcing webs or ribs 50 extend between and are welded to disk 46 and sleeve 44. Rim 48 serves as a support or point of attachment for a plurality of rotor blades 52. For this purpose the rim is provided with a series of uniformly spaced holes 51 and secured in each hole is a bushing 54. Additionally each rotor blade 52 is provided at its inner end with means for adjustably attaching it to a bushing 54. Preferably, as shown in FIGS. 4 and 5, the blade attaching means comprises a disk 56 welded to the inner end of each rotor blade. Each disk 56 has a circular center hole to accommodate the head 58 of a bolt 60. The head 58 is welded in place as shown at 62. Thus, the bolts 60 and the disks 56 form integral extensions of the rotor blades. Each disk 56 seats in a hole 51 with the attached bolt 60 extending through one of the bushings and being screwed in place by a nut 64 and a friction or lock washer 66. By releasing the nuts it is possible to turn the rotor blades so as to adjust the angle of attack thereof. To facilitate locking the rotor blades in a selected position, it is preferred to provide each of the disks 56 with two circumferentially spaced holes 67A and 67B and a locking pin 68 which is secured selectively in one of those holes; also each of the bushings 54 is provided with a plurality of identical evenly spaced holes 70 which are located and sized to receive the locking pin 68 carried by the corresponding disk 56. Holes 67A and B are spaced from one another by an amount equal to $1\frac{1}{2}$ times the space between holes 70, e.g., holes 67 and 70 may be spaced apart 30° and 20° respectively. Each rotor blade is lockable in any one of a plurality of different angular positions which are determined by shifting pin 68 from hole 67A to hole 67B or vice versa and rotating the disk 56 so as to advance pin 68 from one to the other of holes 70. Thus, if $\alpha$ is the angle between holes 70 and an angle of $1\frac{1}{2} \alpha$ separates holes 67A from 67B, shifting pin 68 from hole 67A to hole 67B changes each of the angular positions in which the rotor blade can be locked by cooperation of pin 68 and holes 70 by $\frac{1}{2} \alpha$.

In contrast to the blades of the inlet stator, each of the blades of the rotor assembly is formed with a helical curvature along its length. While the rotor blades may be formed so that their opposite sides are flat in cross-section, it is preferred that the blades have a cross-section generally similar to that of an airfoil. Specifically, as shown in FIGS. 1 and 5, at each point along the longitudinal axis of the rotor blade, one side 72 of the rotor blade is formed with a concave curvature and the other side 74 is formed with a convex curvature. Additionally, the rotor blade is curved helically about the pivot axis of disk 56, which is eccentric to the longitudinal center line of the rotor blade, and the inner or anchored end of the blade has a smaller dimension from edge to edge than the outer or free end. However, the leading and trailing edges 76 and 78 of the rotor blade each lie in planes that extend radially of sleeve 44. Thus the air displacement of the rotor blade increases with increasing distance from sleeve 44. The pitch of the blade also varies with increasing distance from sleeve 44, with the absolute value of the pitch being set by the angular position of the disk 56 relative to bushing 54. Preferably the blade is curved helically through an angle of about 15-20° and the blade is set by rotation of disk 56 so that the angle of attack of the leading edge 76 is optimum for the prevailing wind velocity. With reference to FIG. 5, the angle of attack is defined as the angle between one line running from leading edge 76 to the pivot axis of the blade and a second line running from the pivot axis at a right angle to the front edge 80 of rim 48. The length of the rotor blades is set so that when the rotor assembly is disposed so that sleeve 44 is concentric with the center axis of the main casing ring, the outer ends of the rotor blades will lie close to but are spaced from the stator spacer ring, with the result that substantially all of the air which passes between the inlet stator blades must pass between the rotor blades.

Still referring to FIG. 3, the outlet stator assembly comprises outer and inner support rings 82 and 84 and a plurality of stator blades 86 which are attached to and extend between the associated support rings. The outlet stator blades 86 are not flat but instead their opposite sides are shaped so that in cross-section each blade has the configuration of an air foil with concave and convex sides 77 and 79 as shown in FIG. 1. These stator blades have knife-like leading and trailing edges. A further requirement of the outlet stator blades is that they be disposed so that their pitch is opposite to the pitch of the rotor blades; this opposite curvature relationship is clearly illustrated in FIG. 1. Like the inlet stator blades, the outlet stator blades 86 may be formed with flanges at their outer and inner ends for attachment to the associated support rings, or they may be secured thereto by welding or brazing. The outlet stator blades also may be solid, as may the inlet stator blades. Preferably, however, the outlet stator blades are hollow as shown in FIG. 1 to reduce weight and also to serve as a feed-through for an electrical cable as hereinafter described.

The outlet stator assembly is attached to the rotor transmission housing which itself comprises a cylindrical shroud 92 and a pair of flat disks 94 and 96 which may be welded to the outer shroud or may have peripheral flanges 98 which are welded to the shroud or attached to it by means of suitable screw fasteners. Disks 94 and 96 each have a center opening and disposed in each center opening is a conventional roller bearing assembly 100 which surrounds and supports a transmission drive shaft 102. The forward end of the shaft has a reduced diameter so that it can extend through the center sleeve 44 of the rotor assembly. Shaft 102 is locked to the sleeve by a conventional key-keyway connection as shown at 106 and by a nut 108 which is screwed onto the end of the shaft and forces sleeve 44 and a spacer 104 against the roller bearing 100 assembly in disk 94. The key-keyway connection assures that the rotor assembly and shaft will rotate as a unit and the nut 108 allows the rotor to be detached from the shaft.

Figure 6:
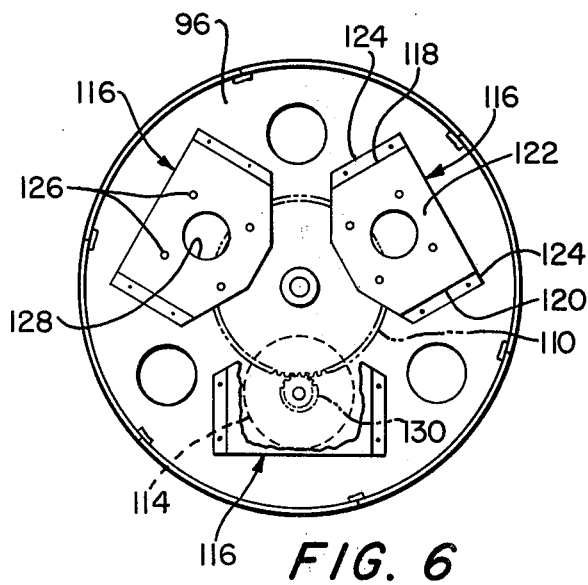
FIG. 6 is a rear view of the rotor transmission housing.

Attached to the rear end of shaft 102 is a large drive gear 110 which forms part of a transmission for driving one or more electrical generating units 114. For this purpose one or more generating unit mounting brackets 116 are attached to the rear side of rear disk 96. As seen in FIGS. 3 and 6, each bracket 116 consists of a pair of side walls 118 and 120, an intermediate plate section 122 that extends parallel to disk 96 and a pair of flanges 124 formed integral with the side walls. These flanges are used to attach the brackets to disk 96 either by welding or by means of suitable fasteners. The plate section of the bracket is used as a point of attachment for the associated electrical generator 114, the plate portion being provided with a plurality of holes 126 for accepting fasteners for securing the electrical generator in place. Each plate section also has an opening 128 through which extends the input shaft of the associated generator. Each opening 128 preferably is large enough to provide clearance for a spur gear 130 which is attached to the input shaft of the generator and meshes with the main drive gear as shown in FIGS. 3 and 6. In FIG. 6, three mounting brackets are illustrated in contemplation of the turbine driving three generator units. However, it is to be appreciated that less or more than three generators may be mounted by brackets 116 to the rotor transmission housing and driven by the rotor assembly.

The rotor transmission and housing are constructed first as a discrete sub-assembly, and then the rotor assembly is slipped onto and secured to shaft 102. Then the resulting assembly is slipped into the main casing ring 16 so that the outer support ring 82 of the outlet stator assembly engages the rear edge of the stator spacer ring 18 and is secured to the main casing ring by suitable fasteners as shown at 132 (FIG. 1).

The tail cone 14 is made as a one-piece hollow structure having the general shape of a regular cone. Preferably it is made of metal so as to better dissipate heat, but it also may be made partly of plastic. The one-piece tail cone 14 shown in FIG. 3 is made of metal and is formed with a peripheral groove 134 at its open end so that it will fit within the rotor transmission housing shroud 92. The tail cone is secured to shroud 92 by screws or other suitable fasteners, and serves as a protective cover for the electrical generator unit 114 and the associated gear train as well as a negative venturi to promote expansion of air passing out of the turbine. Preferably the tail cone is slotted to form louvres as shown at 136 to permit circulation of cooling air.

The tail cone may, if desired, be provided with a hole on its bottom side to accommodate a flexible power cable 137 for connecting the electrical generator unit 114 to a power consuming or storing device, e.g. a lead storage battery. Preferably, however, the cable 137 is lead out of the turbine via aligned holes in stator support ring 84 and shroud 92, the interior of one of the hollow stator vanes 86, and aligned holes in support ring 82, main casing ring 16, one of the shroud sections 144, and one of the jacket sections 150, as represented schematically by the broken line 139 in FIG. 3.

The outer shroud 2 consists of at least two, and preferably more than two, complementary sections each made of a light-weight closed cell rigid foamed plastic such as polyurethane or polyethylene foam. In the embodiment shown in FIG. 3, the shroud 2 consists of thirty six identical sections 144 made of closed cell polyurethane foam. As viewed in cross-section (see FIG. 2), each section 144 is generally wedge-shaped with circularly curved outer and inner surfaces each extending through an angle of 360°/n where n is the number of shroud sections, and flat side surfaces which extend radially of the center axis of the turbine. Additionally the outer surfaces 146 of sections 144 are straight in longitudinal section. As a consequence, if the sections are assembled side by side and prevented from separating by some suitable circumferentially extending means such as the jacket 3, they will mutually support one another and form a circular array with their outer surfaces combining to give the shroud a cylindrical outer configuration.

The jacket 3 may consist of two semi-cylindrical jacket sections but preferably it comprises three or more sections of like size. In the illustrated embodiment (see FIG. 2) the jacket consists of six like sections 150 which preferably are made of metal such as aluminum but also may be made of a plastic material of suitable physical characteristics, e.g. polypropylene or an epoxy resin reinforced with glass filaments or fabric. The jacket sections 150 are circularly curved in cross-section but straight in a longitudinal sense, and their side edges are bent to form offset lips 152 which extend into slots 154 formed in the outer surfaces of selected ones of the shroud sections 144. Six slip-lock cleats in the form of channel members 156 hold the jacket sections 150 in assembled relation, each channel member extending into the slots 154 of two adjacent shroud sections and having rolled over side edges 158 which slidably interlock with the lips of two jacket sections as illustrated in FIG. 2. The slip-lock cleats preferably are made of the same material as the jacket sections, and the cleats and/or jacket sections are sufficiently resilient to permit them to be assembled together about the shroud sections and to hold the latter tight against one another so that they form a dimensionally stable shroud.

Referring to FIGS. 1 and 3, the shroud 2 is assembled around the main casing ring with the stiffening rings 20 extending into recesses 159 formed in the center portions 162 of the inner surfaces of the shroud sections. Rings 20 and recesses 159 cooperate to prevent relative movement of the shroud and main casing relative in an axial direction. The main casing ring also supports the shroud.

The inner surface of each shroud section 144 comprises a forward mouth-defining portion 160, a center portion 162 and a rear exit-defining portion 164, with the inner surfaces of all three portions being circularly curved in cross-section but differing in shape in a longitudinal sense. As seen in FIG. 3, the forward portion 160 forms a knife edge with the front end of outer surface 146 and curves inwardly and rearwardly away from the knife edge back to the center portion 162 which is straight in longitudinal profile. Preferably the slope of the curve formed by the longitudinal profile of the forward portion 160 decreases progressively with increasing distance radially from the outer surface 146. The rear portion 164 of the inner surface of each shroud section forms a knife edge with the rear end of outer surface 146 and has a substantially flat longitudinal profile which extends at an acute angle to outer surface 146. Thus when the shroud sections are assembled in a circular array as shown in FIG. 1, the forward portions 160 of their inner surfaces form a smooth bell shaped Venturi mouth, the center sections 162 form a cylindrical throat, and their rear portions 164 form a conically flared exit.

The above-described turbine is designed to direct the air flow away from the axis of revolution of the rotor to increase the torque and also to increase the velocity of air flow through the rotor stage so as to increase the rotational speed of the rotor. These objectives are accomplished by means of outer shroud 2, the nose and tail cones, and the stator and rotor stages. In this connection it is to be noted that the wind collecting Venturi mouth formed by the forward ends of the shroud sections 144 is substantially larger at its leading edge than the outer perimeter of the rotor and also is aeordynamically streamlined so as to smoothly reduce the outer diameter of the air passage to that of the inlet stator stage. Additionally the streamlined nose cone tends to direct the incoming air away from the center axis of the turbine, with the result that the cross-sectional area of the air passage into the inlet stator is reduced from the inside as well as from the outside. The contraction of the air as it passes through the Venturi mouth into the section of the throat formed by the inner and outer rings 22 and 24 of the inlet stator produces an increase in the velocity of the air stream.

Preferably the turbine is designed so that the total cross-sectional area for the collection of wind currents provided by the space between the leading edge of shroud 2 and the tip of nose cone 12 is at least about twice the cross-sectional area of the air passage through the turbine. Preferably the diameters of the outside of the rotor rim 48 and the perimeter of the rotor (which is only slightly less than the inside diameter of spacer ring 18) are equal to about one third and two thirds respectively of the maximum diameter of the Venturi mouth. The outer diameter of the ring 22 of the inlet stator serves as a continuation of the streamlined nose cone 12 and is approximately the same as the outer diameters of the rotor rim and the rear stator support ring 84. The tail cone 14 and the exit end of the shroud likewise are streamlined to provide an expanding transition or exit, with the cross-sectional area of the air passage at the outlet stator being essentially the same as its area at the inlet stator and the cross-sectional area of the air passage at the rear extremity of the exit being essentially the same as at the forward extremity of the Venturi mouth. As a consequence, the wind passing through the turbine is increased to its maximum velocity as it passes through the rotor stage, while its velocity will be reduced as a consequence of its expansion radially as it travels through the gradual transitions of the shroud and the tail cone. The air stream exits the turbine at substantially the same velocity as it had on entering the turbine. Additionally, the streamlined vanes of the inlet stator tend to "straighten" the incoming air flow so that the air entering the rotor stage is substantially laminar, i.e. non-turbulent. The gradual transition or expansion of air passing out to the atmosphere serves to avoid turbulence and reduce aerodynamic losses. The helical shape of the turbine blades is set so that the air velocity through the rotor stage will be substantially constant along the entire length of the turbine blades. This result is achieved by having the pitch of the rotor vanes less at the hub than the pitch at the outer blade tips, as shown in FIGS. 1 and 5.

Described briefly, the turbine described above functions as follows: air entering the Venturi mouth of the turbine is concentrated and undergoes an increase in velocity as it passes through the mouth into the inlet stator stage. The air is made laminar or at least substantially less turbulent as it passes between the vanes of the inlet stator into the rotor stage. The high speed air causes the rotor to rotate at a speed proportional to the velocity of the air at the leading edge of the Venturi mouth. As the rotor is driven, the output shaft 102 acts through the associated gear system to drive the associated generator 114, thereby producing power which is transmitted to the desired point of use or storage by the take-off cable 137. As the air passes through the output rotor stage it straightens out and is directed into the exit section where it expands gradually and leaves the turbine unit at essentially the same velocity as it entered the unit.

For maximum benefit the turbine should be mounted so that it can pivot to continually face the wind. Therefore, as shown in FIG. 2, the above-described turbine is mounted on a platform 170 which is carried by a large annular bearing structure 172. The turbine rests in a cradle 167 attached to the upper side of the platform and is held down by a flexible strap 169 which surrounds the jacket 3 and has its ends releasably secured to the cradle.

The bearing comprises an annular outer race 174 to which platform 170 is secured by screws 176, and an annular inner race 178 which is secured to a plate 180 by means of screws 182. The plate 180 forms part of a suitable support structure shown in part at 184 which, for example, may be a steel frame or tower anchored to the ground or to a structure such as a building. Platform 170 is supported horizontally and rotates on a vertical axis relative to the plate 180 by virtue of the rotational movement afforded by the balls 186 which are disposed between the inner and outer races. Preferably the axial length of the shroud 2 is sufficiently great to tend to keep the turbine heading into the wind, and tail fins (not shown) may be attached to the outside of the turbine casing to further assist in keeping it facing the wind. The take-off cable 137 is preferably connected to a storage or distribution system via slip rings (not shown), with the rotating portions of the slip rings attached to platform 170 and coupled to cable 137, and the fixed portions thereof attached to the plate 80 and coupled to the storage or distribution system via another cable (also not shown).

Figure 7:
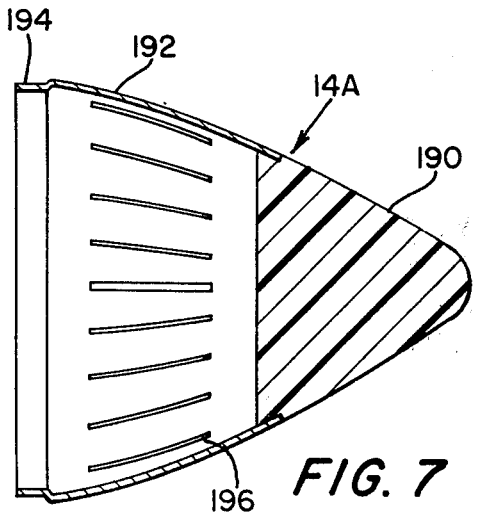
FIG. 7 is a longitudinal sectional view of the tail cone.

FIG. 7 illustrates a modified form of tail cone which can be used in practicing the invention. In this case the tail cone 14A consists of a solid conical end section 190 which is made of a light weight plastic material, preferably a foamed closed cell plastic such as polyurethane foam, and a hollow frustoconical metal section 192 which is provided with a cylindrical section 194 that is sized to fit within the cylindrical shroud 92. The metal section 192 is attached to the shroud 92 by suitable fastener means, e.g. screws (not shown) and is provided with elongate openings that form louvres 196 to permit circulation of air for removing heat from the electrical generating units which fit within the hollow metal section 192.

Figure 8:
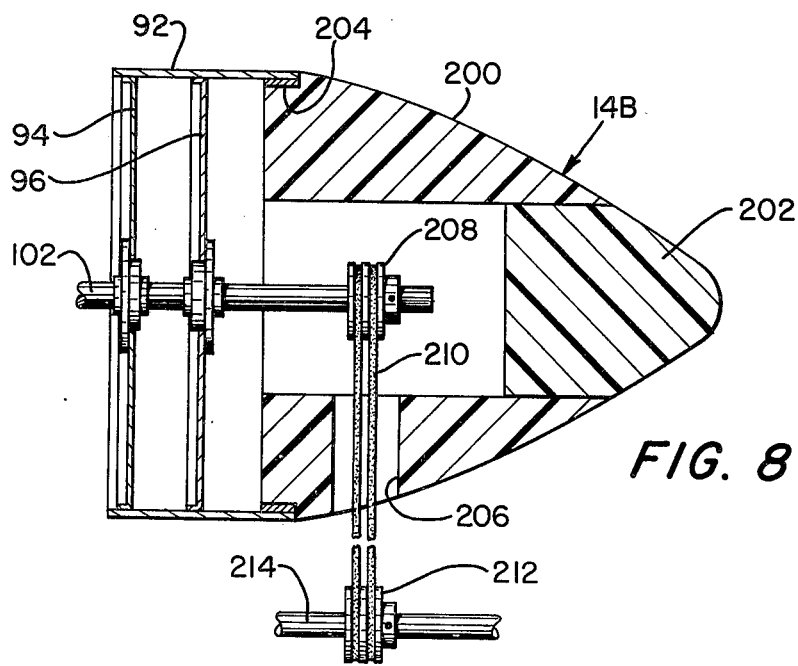
FIG. 8 is a longitudinal sectional view illustrating a modified form of tail cone and means for driving a remote device.

FIG. 8 illustrates a further modification of the invention. In this case, the tail cone 14B comprises a hollow tapered plastic section 200 closed at one end by a complementary plug section 202. Section 200 may be formed of a number of pieces assembled together like parts 36A of the nose cone. The exposed exterior shapes of sections 200 and 202 provides the tail cone with a generally conical shape. The larger end of the plastic section 200 is formed with a groove in which is secured a metal ring 204. The latter serves to receive screws (not shown) for attaching the tail cone to the shroud 92. The plastic section 200 also is formed with a bottom side opening 206. The electrical generator units 114 and their supporting brackets 116 are omitted in this embodiment of the invention, and instead the shaft 102 is extended in length so that its rear end protrudes within the tail cone 14B. Secured on the rear end of shaft 102 is a pulley 208 for driving one or more belts 210 which extend through the opening 206 and are coupled to a pulley 212 secured on a power take-off shaft 214 that is rotatably supported by a bearing (not shown) anchored to platform 170 and is coupled to drive a device such as a pump (not shown) through suitable transmission means which, for example, may include a connecting rod that extends down through the center of platform 170, bearing 172, and plate 180.

Figure 9:
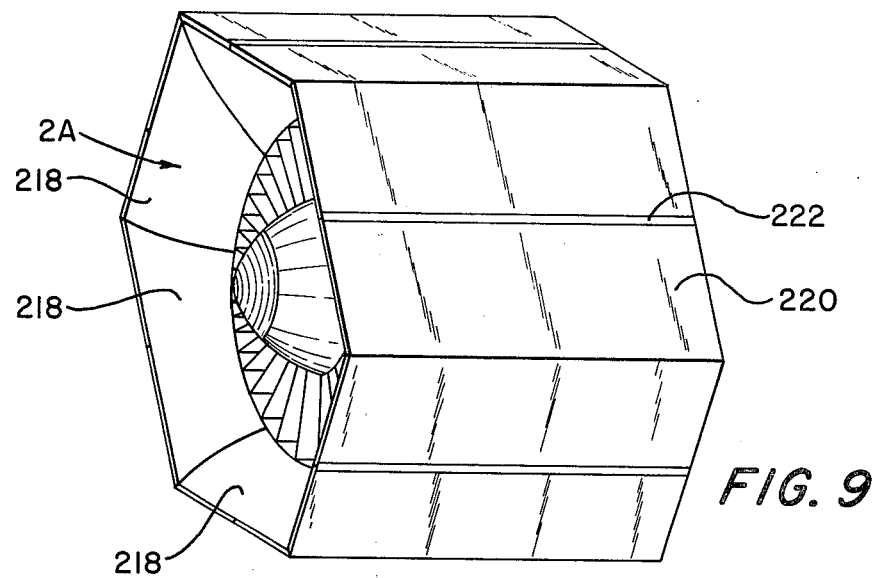
FIG. 9 is a perspective view of a hexagonally shrouded turbine constituting an alternative embodiment of the invention.
Figure 10:
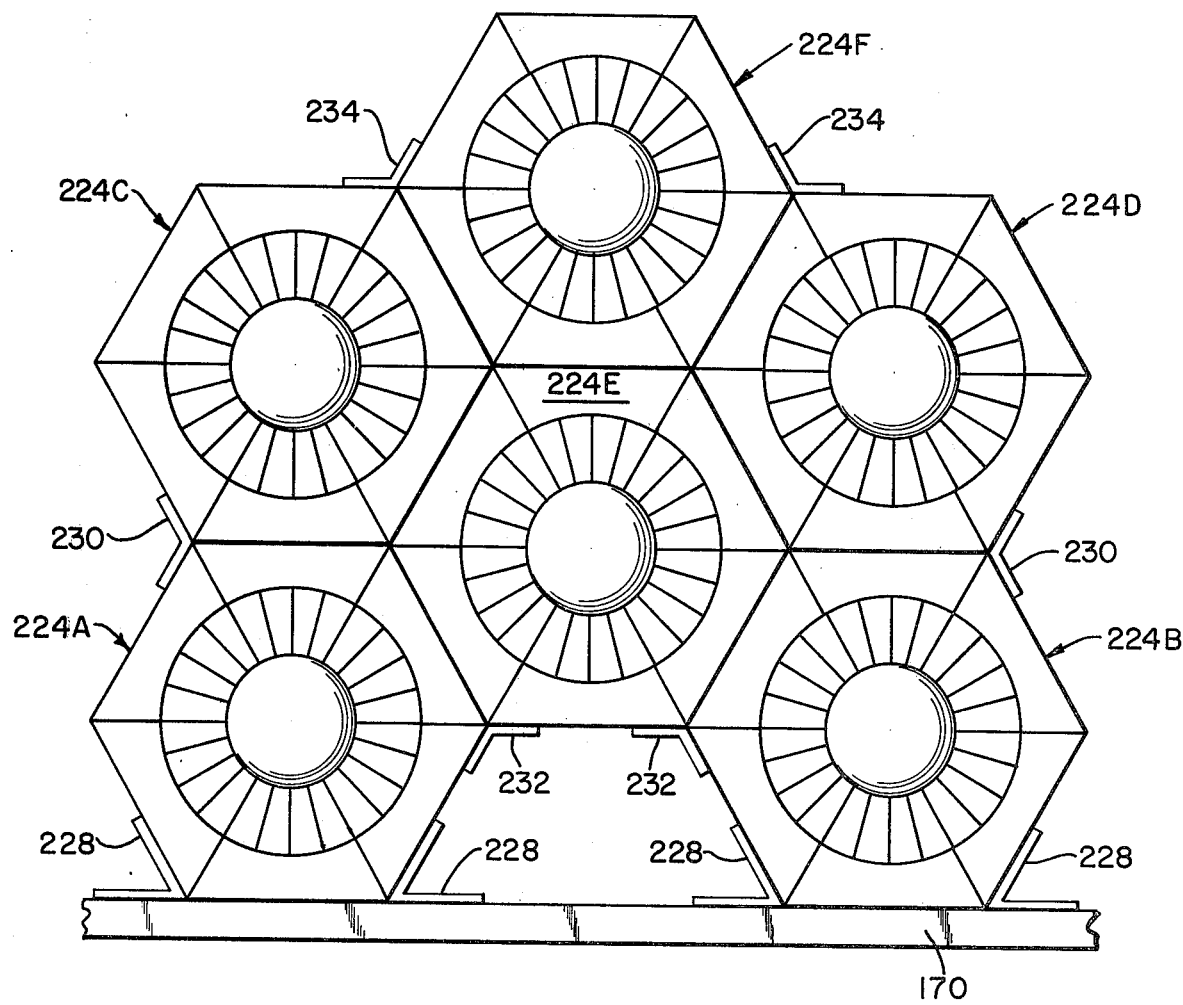
FIGS. 10–12 are front views in elevation showing a number of turbines disposed together as a unitary clustor or array.

FIGS. 9 and 10 illustrate a further modification of the invention. In this case, the shroud 2A is formed so that its exterior shape is hexagonal rather than circular in cross-section. The shroud 2A is formed of a number of sections 218 (preferably six as shown) whose inner surfaces are contoured exactly like the inner surfaces of the sections 144 of shroud 2. These sections 218 are held in assembled relation by means of an exterior metal jacket which consists of six flat metal sheets 220 which are bent to an angle of approximately 120°. The longitudinal side edges 222 of these sheets are secured to the adjacent side edges of the adjacent sheets by slide lock fasteners of the type illustrated in FIG. 2.

The advantage of the hexagonal design illustrated in FIG. 9 is that it facilitates assembling a plurality of such turbines in a compact array where the individual turbines support one another. A typical array is illustrated in FIG. 10 where six hexagonally shaped turbines are supported by platform 170. The two bottom turbines 224A and B are secured to the platform 170 by angle irons 228 which are secured to the outer jackets of the turbines by suitable fastener means such as screws. The two bottom turbines 224A and B are spaced apart and supported by each of these turbines are two additional trubines 224C and 224D. The latter are secured to turbines 224A and 224B by angle iron plates 230. Disposed among the aforesaid four turbines is a fifth turbine 224E which has two of its sides engaging sides of the two bottom turbines 224A and B while two others of its sides engage adjacent sides of the turbines 224C and D. Angle irons 232 connect turbine 224E to turbines 224A and B. Resting on turbine 224E is the sixth turbine 224F which also engages confronting sides of the two upper turbines 224C and D and is secured to the latter by additional angle irons 234. Each of these turbines may comprise one or more electrical generating units 114, with the output power lines from the turbines being brought down through the platform 170 to one or more power consuming or power storage devices.

Figure 11:
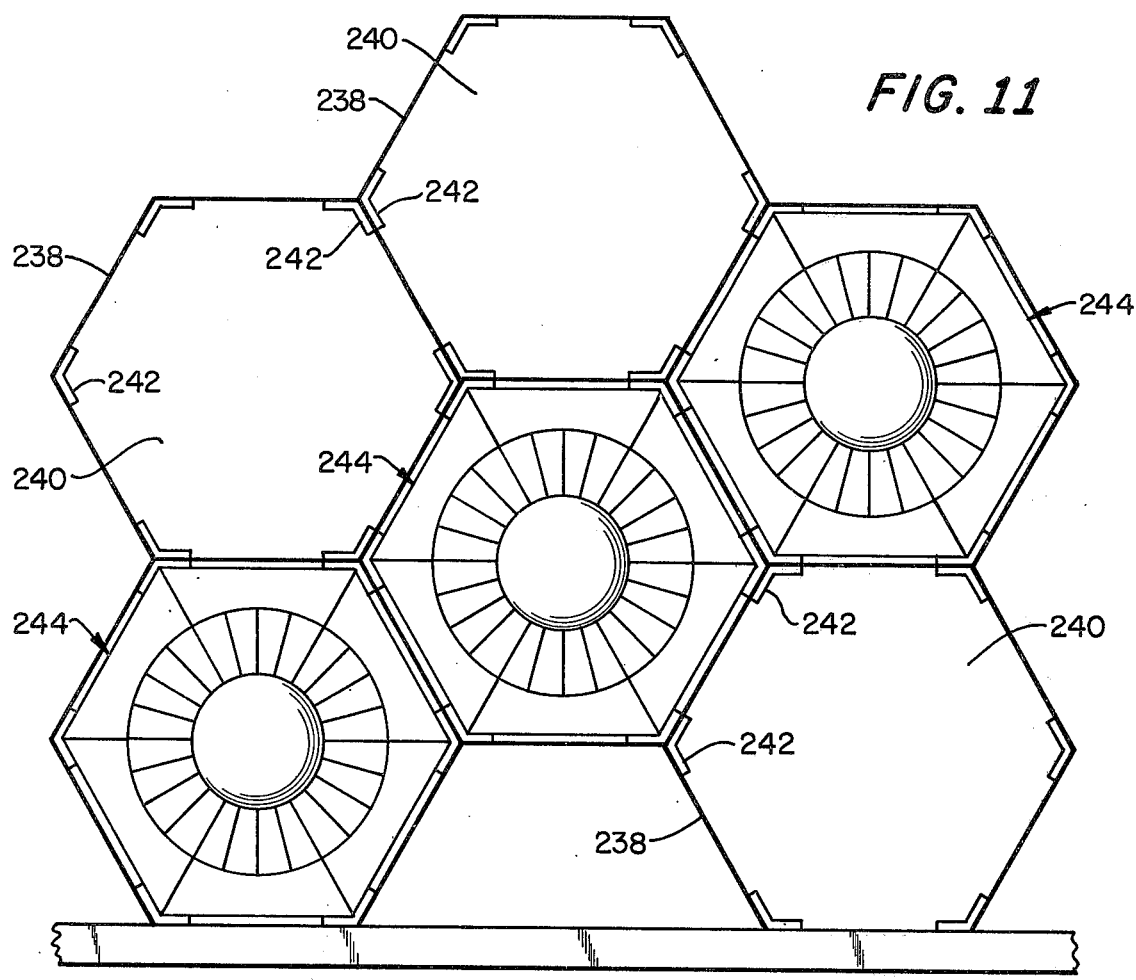

FIG. 11 illustrates an alternative mode of mounting a plurality of the hexagonally shaped turbines of FIG. 9 in a compact array. In this case a honeycomb support structure is formed consisting of a plurality of frame members 238 which are welded so as to form open ended hexagonal chambers 240. The number of chambers 240 may be varied depending upon the number of turbines to be clustered together. At each corner of each hexagonal chamber 240 angle irons 242 are secured to the adjacent frame members 238. The angle irons 242 serve as guides for the turbines identified generally by the numeral 244 so that clearance is afforded between the outer jacket of the turbines and the frame members 238. Additional means (not shown) may be used to restrain the turbines 244 against movement lengthwise in the chambers 240. Such restraining means may take the form of screws extending through the frame members 238 into the outer jackets of the turbines, or small plates that are secured to the leading and trailing edges of the frame members 238 and protrude slightly into the chambers 240 so as to overlap and engage the leading and trailing edges of the jacket. The use of the honeycomb supporting structure facilitates removal of turbines for maintenance and repair, as well as providing a simple and easy mode of assembling a plurality of turbines in close proximity to one another. The output power lines from the electrical generating units of individual turbines 244 may be brought out through the spaces between the frame members 238 and the outer jackets of the turbines.

Figure 12:
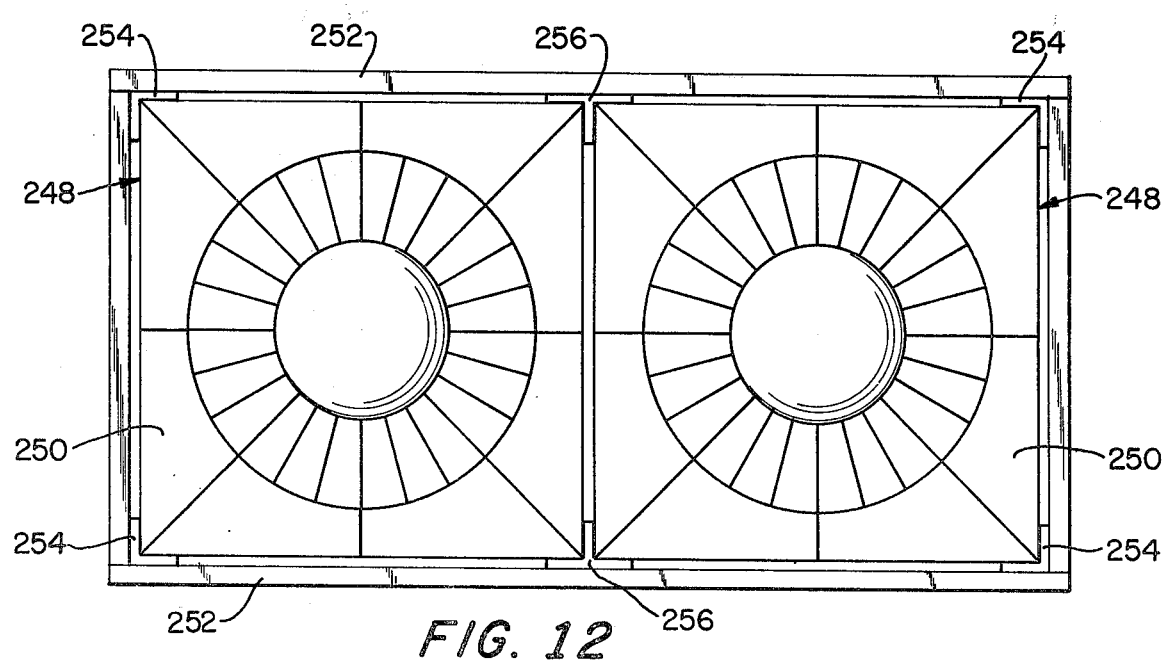

FIG. 12 illustrates a modification of the invention wherein the turbines 248 are similar to the turbines shown in FIGS. 1 and 9 except that the outer perimeter of the shroud 250 has a square configuration. However, the inner periphery of the shrouds 250 of the turbines are circular and the forward portions of the inner surfaces of the shrouds are curved, in the manner of the shroud illustrated in FIG. 1. In this case the two turbines 248 are mounted in a frame which consists of a plurality of frame members 252 which are connected together so as to form two turbine-receiving chambers having a square cross-sectional configuration. As in the example of FIG. 11, the arrangement of FIG. 12 includes a plurality of L-shaped and T-shaped angle irons 254 and 256 which are secured to the frame members 252 at the corners of the chambers. Suitable means (not shown) may be employed to restrain the turbines against movement lengthwise of the chambers. The arrangement of FIG. 12, and also the arrangement of FIG. 11, may be mounted to a rotatable platform such as shown at 170 in FIG. 2, so that the entire cluster of turbines can be pivoted to face into the wind.

The number of stator and rotor vanes may vary and they may be made be various materials. Preferably they are made of a lightweight metal such as aluminum or a plastic material. It is preferred that the number of inlet stator vanes be exactly equal to and have the same spacing as the rotor vanes, while the number of outlet stator vanes preferably is less than the number of rotor vanes.

Wind turbines made as herein described offer the advantages that they are lightweight, capable of being made without expensive specially designed machinery and of being assembled by semi-skilled laborers, and do not require the use of exotic and expensive materials. Most important of all, a turbine made as herein described is capable of substantially greater power output than a conventional windmill having the same rotor diameter, i.e. the diameter of the circle of rotation of the rotor blade tips. In this connection it is to be noted that the power is generated by my wind turbine according to the following relationship:

$$P = f[D^2 V^3 - D_1^2 V^3]$$

where P represents power, V is the velocity of the wind passing through the rotor blades, and D and $D_1$ are respectively the diameter of the circle of rotation of the tips of the rotor and the diameter of the rotor hub. By way of example, a circular turbine of the type shown in FIGS. 1-3 having a shroud providing a Venturi mouth with a diameter of 8 feet at the front end, a rotor perimeter diameter of 6 feet, and a rotor hub diameter of 3 feet, whereby the effective cross-sectional area of the air passage is about 50 feet$^2$ at the leading edge of the outer shroud and about 21 feet$^2$ at the inlet stator, will provide at a prevailing wind speed of 10 miles per hour, an output which is equivalent to that of a conventional windmill having a rotor diameter of approximately 18 feet. Thus, the invention provides a device for producing power from wind energy which is substantially more efficient and compact than a conventional windmill.

An optional feature of the invention is to provide the foam plastic shroud sections 144 with a coating as indicated by the dotted lines 145 for the purpose of reinforcing the exposed surfaces of the shroud and/or making such surfaces more smooth so as to promote high velocity air flow. By way of example, coating 145 may be made of a polymerized epoxy or phenolic resin and may be relatively thin, e.g. 0.005 inch, or relatively thick, e.g. 0.20 inch. Similar coatings 147 and 149 may be applied to the exposed surfaces of the nose and tail cones for the same or other reasons. It also is to be appreciated that the electrical generating units may be A.C. or D.C. generators and that they may be located within the nose cone instead of the tail cone as shown. Another possible modification is to have more than one rotor on shaft 102, with the number of stator stages increased correspondingly. Thus, for example, the turbine could have two rotors with a third stator stage located between the two rotors. Still other modifications will be obvious to persons skilled in the art.

What is claimed is:

1. An air turbine comprising:

first and second stator assemblies;

a rotor assembly;

said stator assemblies and said rotor assembly being disposed in line with one another along a center axis with said rotor assembly located between said stator assemblies;

a shroud surrounding said first and second stator assemblies and said rotor assembly, said shroud having an inwardly tapered mouth at one end forward of said first stator assembly for funneling air into said first stator assembly, an outwardly tapering exit at an opposite end rearward of said stator assembly for expanding air radially away from said center axis as it passes out of said second stator assembly, and a throat section for confining the air passing through said first stator assembly so that substantially all of said passing air travels through said rotor assembly and thereby causes rotation of said rotor assembly;

a nose cone centered in said mouth and tapered outwardly with decreasing distance from said rotor assembly so as to direct incoming air away from said center axis toward the outer periphery of said first stator assembly, said nose cone working in conjunction with said inwardly tapered end of said shroud so as to increase the velocity of an air stream entering said inwardly tapered end of said shroud;

a tail cone centered in said exit for promoting a smooth expansion of air toward said center axis as said air passes out of said second stator assembly, said tail cone tapering inwardly with increasing distance from said rotor assembly and working in conjunction with said outwardly tapered end of said shroud so as to assist in discharging an air stream exiting from said throat section; and transmission means connected to said rotor assembly for transmitting the energy of rotation of the rotor assembly to a power device, said transmission means being at least partially disposed within said tail cone.

2. An air turbine according to claim 1 wherein the cross sectional area of the air passage through the turbine is substantially the same at the forward end of said mouth and at the rear end of said exit.

3. An air turbine according to claim 1 wherein said tail cone is affixed to and supported by said second stator assembly.

4. An air turbine according to claim 1 wherein said first stator assembly comprises a plurality of radially-extending stator vanes each having an inner end spaced from said center axis and an outer end terminating close to said shroud, and further including a support ring to which the inner ends of said stator vanes are secured.

5. An air turbine according to claim 4 wherein said nose cone is connected to and supported by said support ring.

6. An air turbine according to claim 4 wherein said first stator assembly comprises another support ring to which the outer ends of said stator vanes are secured.

7. An air turbine according to claim 4 wherein said stator vanes are substantially flat and extend substantially parallel to said center axis.

8. An air turbine according to claim 1 wherein said rotor assembly comprises a plurality of rotor vanes that extend radially of said center axis and have a helical curvature and said second stator assembly comprises a plurality of stator vanes that extend radially of said center axis and have a helical curvature opposite to the helical curvature of said rotor vanes.

9. An air turbine according to claim 1, further including an electrical generating unit coupled to said transmission means so that it may be driven by the energy of rotation of said rotor assembly, said electrical generating unit being disposed within said tail cone.

10. An air turbine according to claim 1 plus at least one additional like turbine, and support means supporting said turbines so that they are proximate and parallel to one another, said support means having openings with each of said turbines disposed in one of said openings.

11. An air turbines according to claim 1 wherein said front stator assembly has flat radially extending blades with the planes of said blades being aligned with the axis of rotation of said rotor assembly, and further wherein said rotor assembly has a plurality of helically curved radially-extending blades.

12. An air turbine comprising:
first and second stator assemblies;
a rotor assembly;
said stator assemblies and said rotor assembly being disposed in line with one another along a center axis with said rotor assembly located between said stator assemblies;
a shroud surrounding said first and second stator assemblies and said rotor assembly;
said shroud comprising at least two separately formed sections which are made of a foam plastic material and are arranged as a closed ring about said stator and rotor assemblies;
retaining means surrounding said shroud for holding said at least two sections arranged as a closed ring about said stator and rotor assemblies;
said shroud having an inwardly tapered mouth at one end for funneling air into said first stator assembly, an outwardly tapering exit at an opposite end for expanding air radially away from said center axis as it passes out of said second stator assembly, and a throat section for confining the air passing through said first stator assembly so that substantially all of said passing air travels through said rotor assembly and thereby causes rotation of said rotor assembly;
a nose cone centered in said mouth for directing incoming airaway from said center axis toward the outer periphery of said first stator assembly;
a tail cone centered in said exit for promoting a smooth expansion of air toward said center axis as said air passes out of said second stator assembly, said tail cone tapering inwardly with increasing distance from said rotor assembly; and
transmission means connected to said rotor assembly for transmitting the energy of rotation of the rotor assembly to a power device, said transmission means being at least partially disposed within tail cone.

13. An air turbine according to claim 12 wherein said retaining means comprises a jacket which is split on its circumference so as to have at least one pair of mutually confronting ends that extend longitudinally of the turbine and means releasably connecting together said at least one pair of mutually confronting ends so as to maintain said jacket in surrounding and constraining relation with said at least two sections, whereby to hold said at least two sections arranged as a closed ring about said stator and rotor assemblies.

14. An air turbine comprising:
first and second stator assemblies;
a rotor assembly;
said stator assemblies and said rotor assembly being disposed in line with one another along a center axis with said rotor assembly located between said stator assemblies;
a shroud surrounding said first and second stator assemblies and said rotor assembly, said shroud having an inwardly tapered mouth at one end for funneling air into said first stator assembly, an outwardly tapering exit at an opposite end for expanding air radially away from said center axis as it passes out of said second stator assembly, and a throat section for confining the air passing through said first stator assembly so that substantially all of said passing air travels through said rotor assembly and thereby causes rotation of said rotor assembly;
a nose cone centered in said mouth for directing incoming air away from said center axis toward the outer periphery of said first stator assembly;
a tail cone centered in said exit for promoting a smooth expansion of air toward said center axis as said air passes out of said second stator assembly, said tail cone tapering inwardly with increasing distance from said rotor assembly;
said shroud consisting of at least three pre-formed sections which are made of a foam plastic material and are arranged side by side with mutually engaging surfaces that extend longitudinally of the turbine;
a main casing ring surrounding said stator and rotor assemblies and surrounded by and supporting said shroud;
means securing said first and second stator assemblies to said main casing ring;
means for preventing said sections from shifting axially of said main casing ring, said last-mentioned means comprising at least one rib on said ring and at least one groove in said sections for receiving said at least one rib; and
transmission means connected to said rotor assembly to a power device, said transmission means being at least partially disposed within said tail cone.

15. An air turbine according to claim 14 further including retaining means surrounding said shroud for releasably holding said shroud sections against said main casing ring.

16. An air turbine according to claim 15 wherein said retaining means is a metal jacket.

17. An air turbine according to claim 16 wherein said metal jacket comprises at least two parts and means releasably holding said at least two parts around said shroud.

18. An air turbine comprising:
first and second stator assemblies;
a rotor assembly;
said rotor assemblies and said rotor assembly being disposed in line with one another along a center axis with said rotor assembly located between and close to said stator assemblies;
a main casing ring surrounding said stator and rotor assemblies;

means securing said stator assemblies to said main casing ring;

means connected to one of said stator assemblies for rotatably supporting said rotor assembly;

a shroud surrounding and supported by said main casing ring, said shroud having an inwardly tapered mouth at a first end thereof for funneling air into said first stator assembly, an outwardly tapering exit at a second opposite end thereof for expanding air radially away from said center axis as it passes from out of said second stator assembly, and a throat section embracing said main casing ring, said mouth and said exit of said shroud extending beyond the front and rear ends of said main casing ring, said shroud comprising a plurality of preformed plastic foam sections arranged side by side circumferentially about said main casing ring;

first and second means on said main casing ring and said plastic foam sections respectively for preventing said foam sections from moving axially of said turbine relative to said main casing ring;

means for holding said plastic foam sections assemblied side by side about said main casing ring;

a nose cone attached to said first stator assembly for directing incoming air away from said center axis toward the outer periphery of said first stator assembly; and means connected to said rotor assembly for transmitting the energy of rotation of the rotor assembly to a power device.

19. An air turbine according to claim 18 further including a tail cone carried by said second rotor assembly for promoting a smooth expansion of air toward said center axis as said air passes out of said rotor.

20. An air turbine according to claim 18 wherein said rotor assembly comprises a cylindrical ring having a plurality of circumferentially spaced holes, a plurality of rotor vanes that extend radially of said rim, each of said rotor vanes having a shaft that extends through one of said holes, and means for locking said rotor vanes to said rim, said locking means including a locking pin on each vane and at least one opening in said rim adjacent to each of said circumferentially spaced holes for receiving one of said locking pins, and means for securing each rotor vane to said rim.

21. An air turbine according to claim 18 wherein said rotor assembly comprises a shaft which rotates with said rotor and said transmission means is connected to said shaft, and further comprising a pair of parallel mutually spaced plates surrounded by and affixed to said second stator assembly, and bearing means attached to said plates and rotatably supporting said shaft.

22. An air turbine according to claim 21 further including at least one electrical generator supported by one of said plates, and further wherein said transmission means is operatively coupled to said generator.

23. An air turbine comprising:

a rotor assembly;

means supporting said rotor assembly for rotation on a center axis;

a shroud comprising at least two separately formed sections arranged as a closed ring about said rotor assembly, said shroud having an inwardly tapered mouth at one end forward of said rotor assembly for funneling air to said rotor assembly, an outwardly tapering exit at an opposite end rearward of said rotor assembly for expanding air radially away from said center axis as it passes out from said rotor assembly, and a throat between said mouth and exit for confining the air passing through said turbine so that substantially all of said passing air travels through said rotor assembly and thereby causes rotation of said rotor assembly;

a nose cone centered in said mouth and tapered outwardly with decreasing distance from said rotor assembly, said nose cone working in conjunction with said inwardly tapered mouth of said shroud so as to increase the velocity of an air stream entering said inwardly tapered mouth and passing to said rotor assembly;

a tail cone centered in said exit and tapered inwardly with increasing distance from said rotor assembly, said tail cone working in conjunction with said outwardly tapered exit of said shroud so as to promote a smooth expansion of air passing out from said rotor assembly;

transmission means connected to said rotor assembly for transmitting the energy of rotation of the rotor assembly to a power device, said transmission means being at least partially disposed within said nose cone or said tail cone; and means rotatably mounting said turbine so as to permit said mouth section to be headed into the prevailing wind.

24. An air turbine according to claim 23 wherein said shroud further comprises retaining means for holding said at least two sections in fixed relation to one another.

* * * * *

UNITED STATES PATENT AND TRADEMARK OFFICE
CERTIFICATE OF CORRECTION

PATENT NO. : 4140433

DATED : February 20, 1979

INVENTOR(S) : Oliver C. Eckel

It is certified that error appears in the above-identified patent and that said Letters Patent are hereby corrected as shown below:

Column 13, claim 12, line 51, "airaway" should be -- air away --.

Column 13, claim 12, line 61, the word "said" should be inserted after the word "within".

Signed and Sealed this

Fifteenth Day of May 1979

[SEAL]

Attest:

RUTH C. MASON
Attesting Officer

DONALD W. BANNER
Commissioner of Patents and Trademarks